(12) United States Patent
Lin et al.

(10) Patent No.: US 9,232,240 B2
(45) Date of Patent: Jan. 5, 2016

(54) DISTRIBUTED CONTENT DELIVERY NETWORK ARCHITECTURE

(75) Inventors: Te-Sheng Lin, Cresskill, NJ (US); Roman Krzanowski, White Plains, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 386 days.

(21) Appl. No.: 13/492,156

(22) Filed: Jun. 8, 2012

(65) Prior Publication Data

US 2013/0332574 A1 Dec. 12, 2013

(51) Int. Cl.
| | |
|---|---|
| G06F 15/16 | (2006.01) |
| H04N 21/222 | (2011.01) |
| H04N 21/2343 | (2011.01) |
| H04N 21/472 | (2011.01) |
| H04N 21/6405 | (2011.01) |

(52) U.S. Cl.
CPC ..... *H04N 21/222* (2013.01); *H04N 21/234309* (2013.01); *H04N 21/472* (2013.01); *H04N 21/6405* (2013.01)

(58) Field of Classification Search
USPC .................................................. 709/219, 217
See application file for complete search history.

(56) References Cited

U.S. PATENT DOCUMENTS

| | | | | |
|---|---|---|---|---|
| 7,353,277 | B1 * | 4/2008 | Carney | H04L 12/403 709/224 |
| 7,603,439 | B2 * | 10/2009 | Dilley | H04L 29/06 709/203 |
| 2011/0055022 | A1 * | 3/2011 | Mehta | G06Q 30/02 705/14.71 |
| 2012/0198506 | A1 * | 8/2012 | Joe | H04N 21/44209 725/97 |

* cited by examiner

*Primary Examiner* — Vivek Srivastava
*Assistant Examiner* — Hermon Asres

(57) ABSTRACT

A master video server may deliver video streams to multiple sub-master video servers pursuant to the request of each sub-master video server. Each sub-master video server, in turn, may deliver video steams to multiple slave video servers pursuant to the request of each slave video server. Each sub-master video server may also deliver video streams to one or more other sub-master video servers pursuant to the request of each of the other sub-master video servers.

22 Claims, 6 Drawing Sheets

DISTRIBUTED CONTENT DELIVERY NETWORK ARCHITECTURE

BACKGROUND

This disclosure relates to content delivery networks, such as content delivery networks that deliver streaming videos.

Some content delivery networks include a master server and several slave servers. Each slave server receives requests from a group of user stations for video streams. After receiving each request, each slave server delivers its own request for the streaming video to the master server. In turn, the master server delivers the requested streaming video to the slave server which, in turn, delivers it to the requesting user station.

This content delivery network architecture can present challenges as the number of user stations grow. Each slave server may be limited in the number of user stations that it can simultaneously service. As a result, additional slave servers may need to be added as the number of user stations grows.

The master server may also be limited in the number of slave servers that it can simultaneously service. As a consequence, this architecture can quickly grow to a size that can no longer be adequately supported by the master server. In turn, this can restrict the number of user stations that can be added to the system. It can also result in poor performance, causing undesirable disruptions during delivery of the video streams.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

A master video server may deliver video streams to multiple sub-master video servers pursuant to the request of each sub-master video server. Each sub-master video server, in turn, may deliver video steams to multiple slave video servers pursuant to the request of each slave video server. Each sub-master video server may also deliver video streams to one or more other sub-master video servers pursuant to the request of the other sub-master video servers. Example configurations of such a video server system are now discussed.

Figure 1:
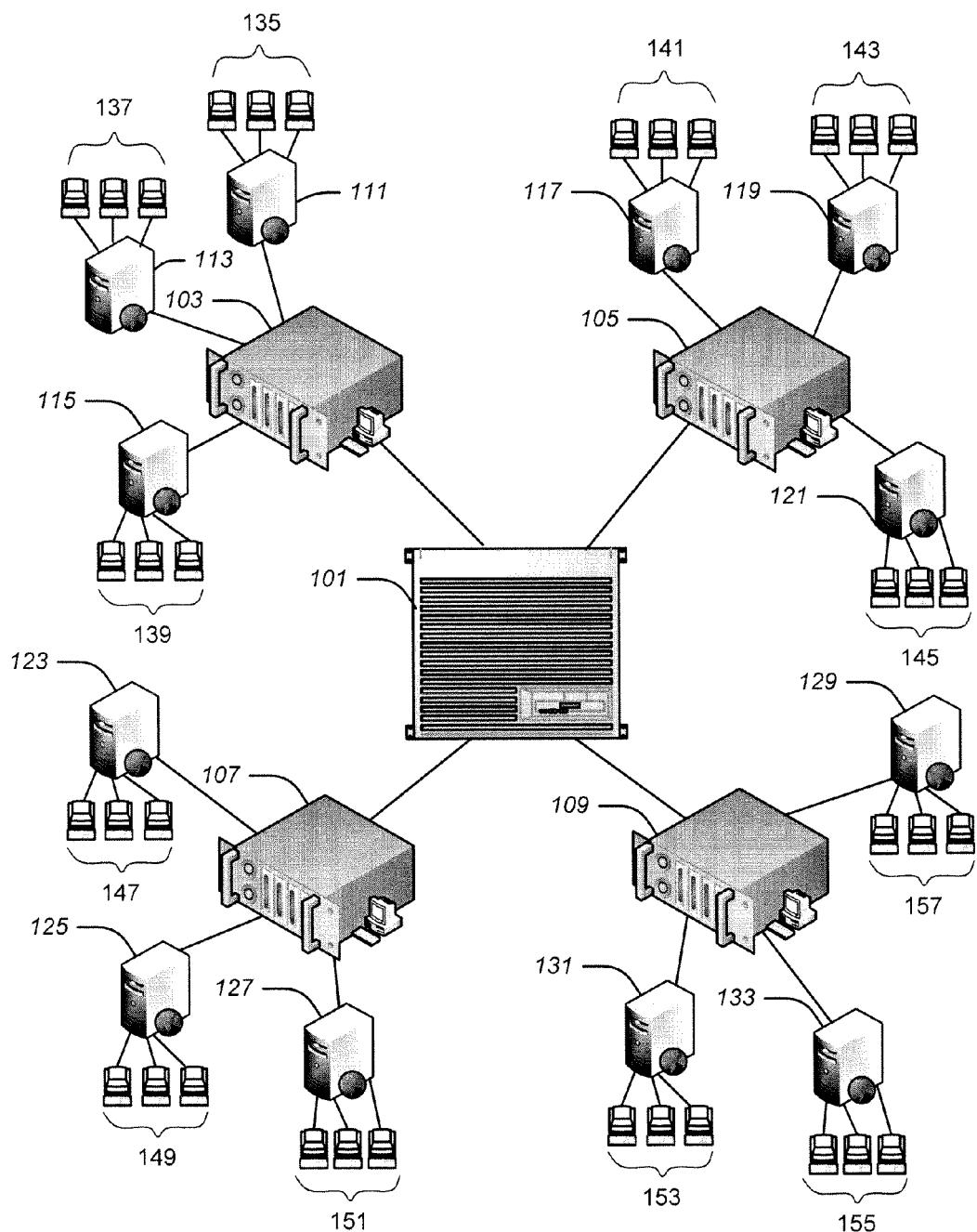
FIG. 1 illustrates a streaming video server system that includes a master streaming video server, sub-master streaming video servers, slave streaming video servers, and user station groups.

FIG. 1 illustrates a streaming video server system that includes a master streaming video server 101; sub-master streaming video servers 103, 105, 107, and 109; slave streaming video servers 111, 113, 115, 117, 119, 121, 123, 125, 127, 129, 131, and 133; and user station groups 135, 137, 139, 141, 143, 145, 147, 149, 151, 153, 155, and 157.

The master streaming video server 101 may be configured to receive video streams of any type, such as real time video streams that may be over the air television channel feeds, multi-player video game feeds, or multi-user virtual world feeds.

Each streaming video may be received by the master streaming video server 101 in any format, such as in the format of IP packets. One or more of the streams may be delivered to the master streaming video server 101 without any request from the master streaming video server 101 using any form of push technology. One or more the streams may instead be delivered to the master streaming video server 101 only after being requested by the master streaming video server 101 using any form of pull technology. The streaming videos may come from any source, such as from satellites, over-the-air television, cable television, and/or dedicated coaxial, microwave, or fiber optic links.

The master streaming video server 101 may be configured to receive sub-master requests for video streams from each of the multiple sub-master streaming video servers. Each sub-master request may be for one of the video streams and may include information indicating where the requested streaming video should be delivered, such as a URL or an IP address. The number of sub-master streaming video servers may be more or less than what is illustrated in FIG. 1.

For each received sub-master request, the master streaming video server 101 may be configured to deliver the video stream requested by the sub-master request to the sub-master streaming video server that made the sub-master request. The master streaming video server 101 may be configured to transcode or otherwise convert each incoming video stream into a format that is more suitable for delivery. For example, there may be a digital-to-digital conversion of one codec to another, such as from MPEG-2 to fragmented MPEG-4 AVC/ H.264. Transrating may also take place. This is a process similar to transcoding in which files are coded to a lower bit rate without changing video formats, such as from 9 Mbps to 500 Kbps, thus enabling delivery over a small pipe. When a received sub-master request includes information indicating where the requested streaming video should be delivered, the master streaming video server 101 may be configured to deliver the requested streaming video to the location indicated in the sub-master request, such as to a specified URL or IP address.

When using pull technology, the master streaming video server 101 may be configured to issue a request for the video stream that is requested by each sub-master request to the source of the requested stream. The master streaming video server may also be configured to detect whether it is already receiving a video stream that has been requested by a sub-master request. In this event, the master streaming video server may be configured not to request a further instances of this video stream from the source. Instead, the master streaming video server may be configured to deliver the requested stream that it is already receiving to both the sub-master streaming video server that made the request before and the sub-master streaming video server that made the most recent request. Protocols such as multicast or unicast may be user for this purpose.

The master streaming video server 101 may be configured not to process requests that come directly from any other source, such as directly from any of the slave streaming video servers and/or any of the user stations. Similarly, the master streaming video server 101 may be configured not to deliver video streams directly to any other destination, such as directly to any of the slave streaming video servers and/or any of the user stations.

Each sub-master streaming video server may be configured to receive slave requests for video streams from slave streaming video servers. Each slave request may be for one of the video streams and may include information indicating where the requested streaming video should be delivered, such as a URL or an IP address. In response to each slave request, each sub-master streaming video server may be configured to deliver a sub-master request to the master streaming video server 101 for the video stream requested by the slave request.

Each sub-master streaming video server may be configured to receive the video stream that is requested by each slave request from the master streaming video server 101. Each sub-master streaming video server may be configured to deliver the video stream that is requested by the slave request to the slave streaming video server that made that request. When a received slave request includes information indicating where the requested streaming video should be delivered, the sub-master streaming video server 101 may be configured to deliver the requested streaming video to the location indicated in the slave request, such as to a specified URL or IP address.

Each sub-master streaming video server may be configured to detect whether it is already receiving a video stream that has been requested by a slave request. In this event, the sub-master streaming video server may be configured not to request a further instances of this video stream from the master streaming video server 101. Instead, the sub-master streaming video server may be configured to deliver the requested stream that it is already receiving to both the slave streaming video server that made the request before and the slave streaming video server that made the most recent request. Protocols such as multicast or unicast may be user for this purpose.

Each sub-master streaming video server may be configured not to process any user request for a streaming video coming directly from any of the user stations. Similarly, each sub-master streaming video server may be configured not to deliver any streaming video directly to any of the user stations.

Clusters of the slave streaming video servers may each individually be configured to communicate with just one of the sub-master streaming video servers, as illustrated in FIG. 1. For example, slave streaming video servers 111, 113, and 115 may each be configured to communicate with only sub-master streaming video server 103. There may be a larger or smaller number of slave streaming video servers in each cluster than what is illustrated in FIG. 1.

Each slave streaming video server may be configured to receive user requests for video streams from user stations. Each user request may be for one of the video streams and may include information indicating where the requested streaming video should be delivered, such as a URL or an IP address. For each received user request, each slave streaming video server may be configured to deliver a slave request to the sub-master streaming video server with which the slave streaming video server has been configured to communicate for the video stream requested by the user request; receive the video stream requested by the user request from the sub-master streaming video server to which the slave streaming video server has been configured to communicate; and deliver the video stream requested by the user request to the user station that made the user request. When a received user request includes information indicating where the requested streaming video should be delivered, the slave streaming video server 101 may be configured to deliver the requested streaming video to the location indicated in the user request, such as to a specified URL or IP address.

Each slave streaming video server may be configured to detect whether it is already receiving a video stream that has been requested by a user request. In this event, the slave streaming video server may be configured not to request a further instances of this video stream from a sub-master streaming video server. Instead, the slave streaming video server may be configured to deliver the requested stream that it is already receiving to both the user station that made the request before and the user station that made the most recent request. Protocols such as multicast or unicast may be user for this purpose.

Each group of user stations may individually be configured to communicate with just one of the slave streaming video servers. There may be a larger or smaller number of user stations in each group of user stations than what is illustrated in FIG. 1.

Each user station may be configured to receive a request for a video stream from a user of the station and/or from an application program running in the user station. In turn, each user station may be configured to deliver a user request for the requested video stream to the slave streaming video server with which it has been configured to communicate. The slave streaming video server with which each user station may be configured to communicate may be designated by a user of the user station, a service to which a user or the user station is subscribed, and/or may be based on current network operating conditions and/or on any other criteria or means.

Each user station may be any type of computing device. For example, each user station may be a desktop computer, a laptop computer, a notebook computer, a smart phone, a PDA, or a tablet computer.

Communications between the various servers and the user stations may take place over any type of computer network, such as the Internet, a wide area network, a local area network, a data network, a cellular network, meshed WiFi, or any combination of these.

Figure 2:
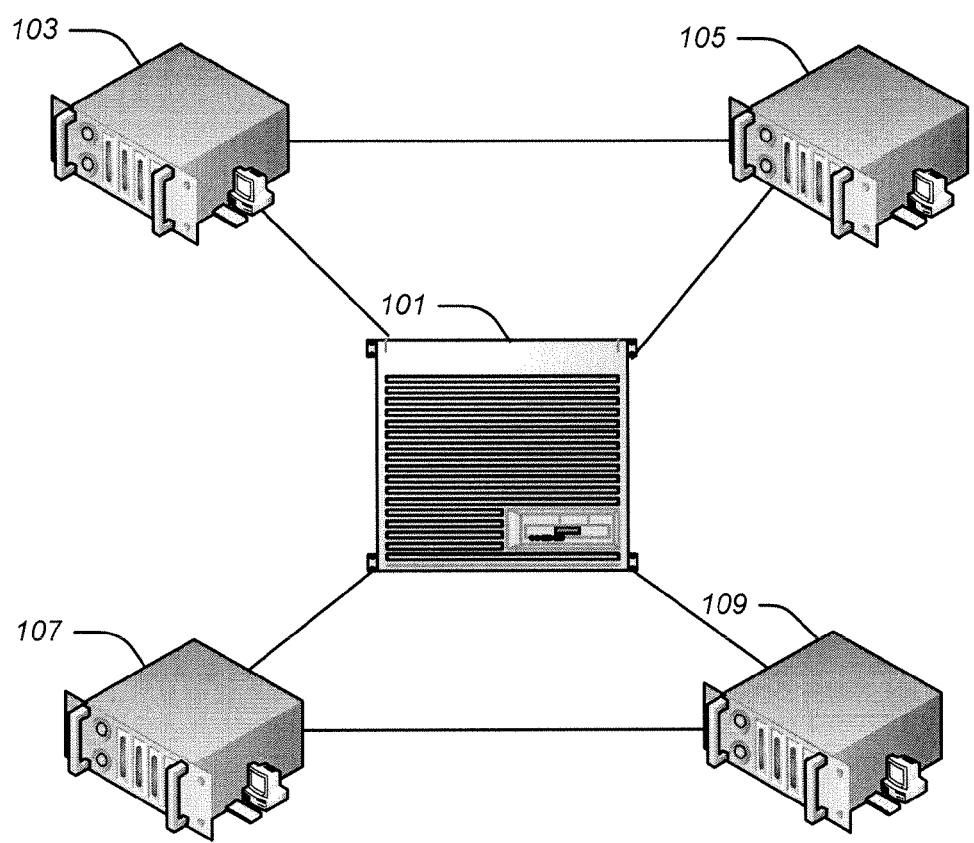
FIG. 2 illustrates an enhancement of the master and sub-master streaming video server portion of the streaming video server system illustrated in FIG. 1 in which each sub-master streaming video server can choose between obtaining a needed video stream from either the master streaming video server or another sub-master streaming video server, such as the other sub-master streaming video server that is closest to it.

FIG. 2 illustrates an enhancement of the master and sub-master streaming video server portion of the streaming video server system illustrated in FIG. 1 in which each sub-master streaming video server can choose between obtaining a needed video stream from either the master streaming video server 101 or another sub-master streaming video server, such as the other sub-master streaming video server that is closest to it. Each sub-master streaming video server may be configured to make this determination based on any considerations, such as whether the other sub-master streaming video server is currently receiving a requested video stream, how close the other sub-master streaming video server is compared to the master streaming video server 101, how congested the other sub-master streaming video server is as compared to the master streaming video server 101, or any combination of these.

Figure 3:
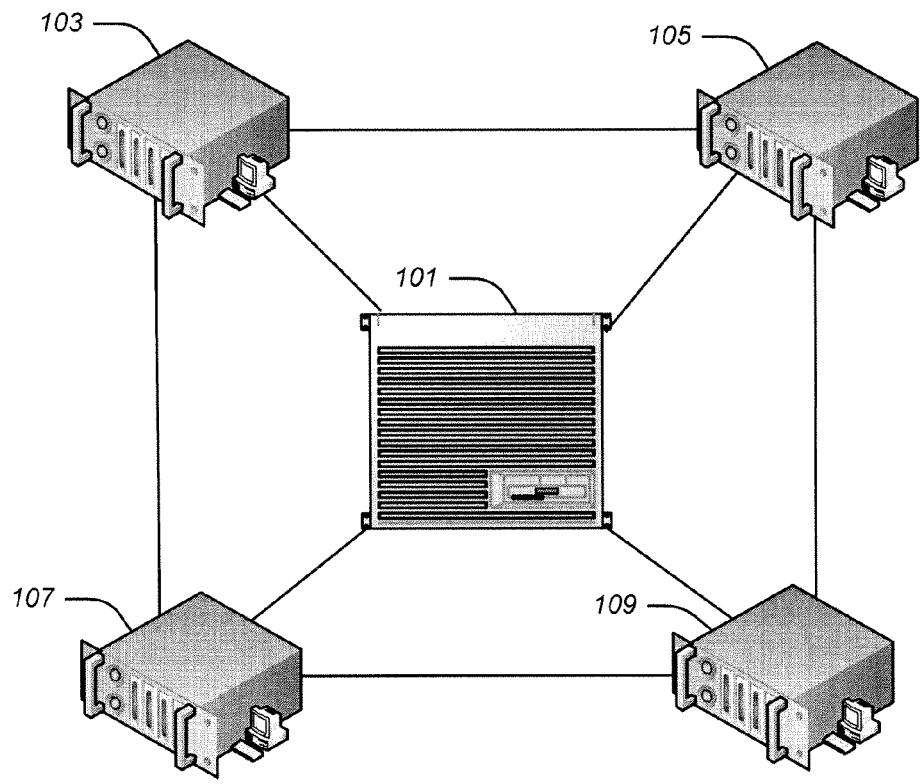
FIG. 3 illustrates an enhancement of the master and sub-master streaming video server portion of the streaming video server system illustrated in FIG. 2 in which each sub-master streaming video server can choose between obtaining a needed video stream from either the master streaming video server or one of a sub-set of the other sub-master streaming video servers.

FIG. 3 illustrates an enhancement of the master and sub-master streaming video server portion of the streaming video server system illustrated in FIG. 2 in which each sub-master streaming video server can choose between obtaining a needed video stream from either the master streaming video server 101 or one of a subset of the other sub-master streaming video servers. This configuration is the same as the one illustrated in FIG. 2, except that each sub-master streaming video server may be configured to choose between obtaining a needed video stream from the master streaming video server or from one of a sub-set of the other sub-master streaming video servers. Each sub-master streaming video server may be configured to make this determination based on any considerations, including any of the considerations discussed above in connection with FIG. 2. In addition, the relative distances from the various other sub-streaming video servers in the subset and/or the relative amounts of their congestions may also be considered.

Figure 4:
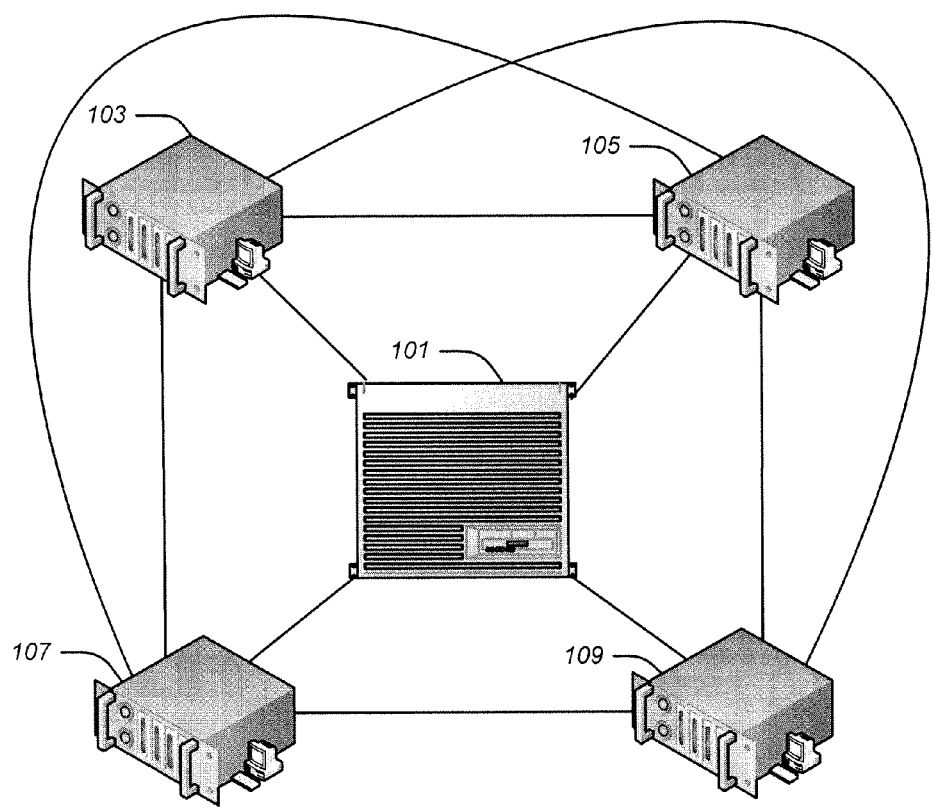
FIG. 4 illustrates an enhancement of the master and sub-master streaming video server portion of the streaming video server system illustrated in FIG. 3 in which each sub-master streaming video server can choose between obtaining a needed video stream from either the master streaming video server or all of the other sub-master streaming video servers.

FIG. 4 illustrates an enhancement of the master and sub-master streaming video server portion of the streaming video server system illustrated in FIG. 3 in which each sub-master streaming video server can choose between obtaining a needed video stream from either the master streaming video server 101 or all of the other sub-master streaming video servers. This configuration is the same as the one illustrated in FIG. 3, except that each sub-master streaming video server may be configured to choose between obtaining a needed video stream from the master streaming video server or from any of the other sub-master streaming video servers. Each sub-master streaming video server may be configured to make this determination based on any considerations, including any of the considerations discussed above in connection with FIG. 3.

Figure 5:
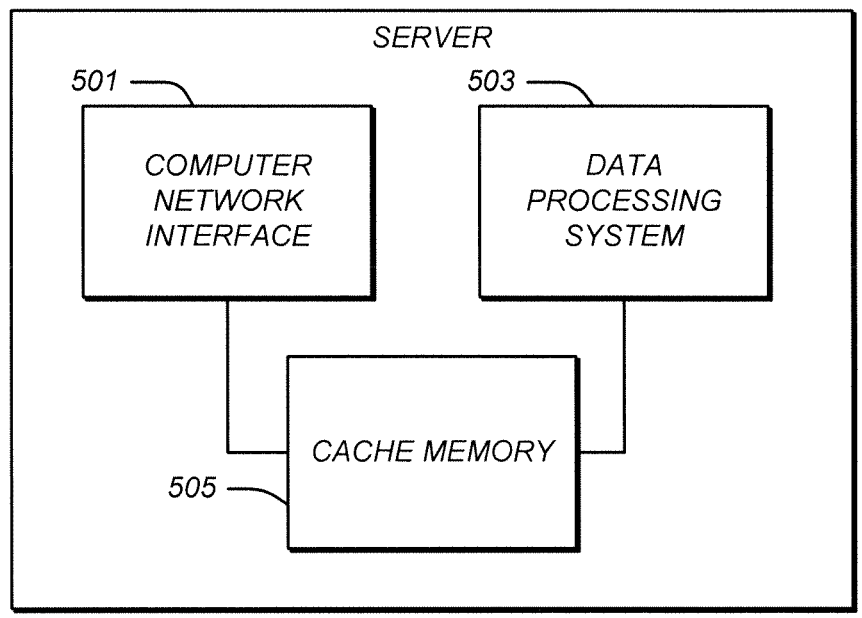
FIG. 5 illustrates an example of components that may be within any of the streaming video servers illustrated in FIGS. 1-4.

FIG. 5 illustrates an example of components that may be within any one of the streaming video servers illustrated in FIGS. 1-4. As illustrated in FIG. 5, the streaming video server may include a computer network interface 501, a data processing system 503, and a cache memory 505.

The computer network interface 501 may be configured to communicate information between the streaming video server and a computer network, such as to receive video streams and/or requests for video streams from the network and/or to deliver video streams and/or requests for video streams into the network. The computer network interface 501 may be of any type. For example, the computer network interface 501 may be a network interface card (NIC).

The data processing system 503 may be configured to manage the operations of the streaming video server, such as to cause the streaming video server to perform the functions of the server as described herein. The data processing system 503 may include one or more computer processors and associated electronics and may include software and associated algorithms configured to provide this functionality.

When part of a master and/or sub-master streaming video server, the data processing system 503 may be configured to provide status information, such as information about what video streams it's server is currently receiving and/or how much of its bandwidth is currently being used. Similarly, the data processing system 503 in such servers may be configured to receive such status information from the master and/or one or all of the other sub-master streaming video servers. As indicated above, this information may be used by the sub-master streaming video servers to aid in determining whether to send a sub-master request for a needed video stream to the master streaming video server 101 or to one of the other sub-master streaming video servers. This status information may be provided by the master and/or other sub-master streaming video servers in response to a request from the data processing system 503 using any type of pull technology and/or may be provided periodically or on any other basis by the master and/or other streaming video servers using any type of push technology.

The cache memory 505 may be configured to act a buffer to store the most recent portion of each video stream that is received by the computer network interface 501. This buffer may be used by the data processing system 503 to prevent temporary delays in the delivery of a video stream to the server containing the data processing system 503 from causing a jitter or other drop out in the video stream that it deliver by this server.

Figure 6:
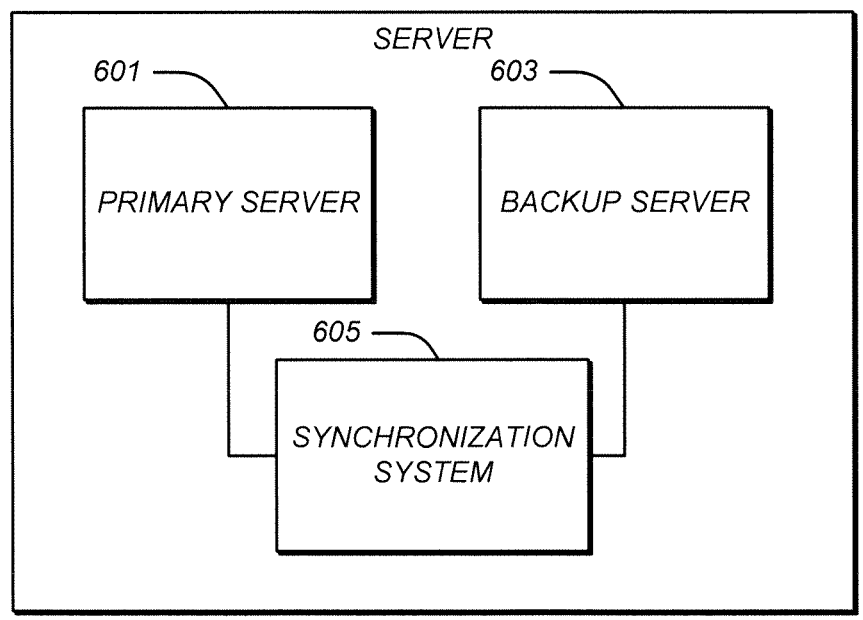
FIG. 6 illustrates an example of a fault protection configuration that may be used in connection with any of the streaming video servers illustrated in FIGS. 1-4.

FIG. 6 illustrates an example of any one of the streaming video servers illustrated in FIGS. 1-4 in a configuration that provides fault protection. As illustrated in FIG. 6, the streaming video server may include a primary server 601, a backup server 603, and a synchronization system 605.

The primary server 601 may be configured to provide the functions of the streaming video server as explained above and may include the components illustrated in FIG. 5 and also discussed above. The backup server 603 may be configured to provide the same or comparable functions and may have the same or comparable components. The backup server 603 may be at the same location as the primary server 601 or a different location. The synchronization system 605 may be configured to ensure that the backup server 603 maintains sufficient state information to take over the responsibilities of the primary server 601 in the event of a fault in the primary server 601. The synchronization system 605 may be configured to detect a fault in the primary server 601. Once detected, the synchronization system 605 may be configured to cause requests to the primary server 601 to be redirected to the backup server 603 and to cause the backup server 603 to provide all of the needed functions of the primary server 601. The synchronization system 605 may be configured to place the primary server 601 back into operation once the fault has been corrected. Any type of fault tolerance technology may be used.

Figure 7:
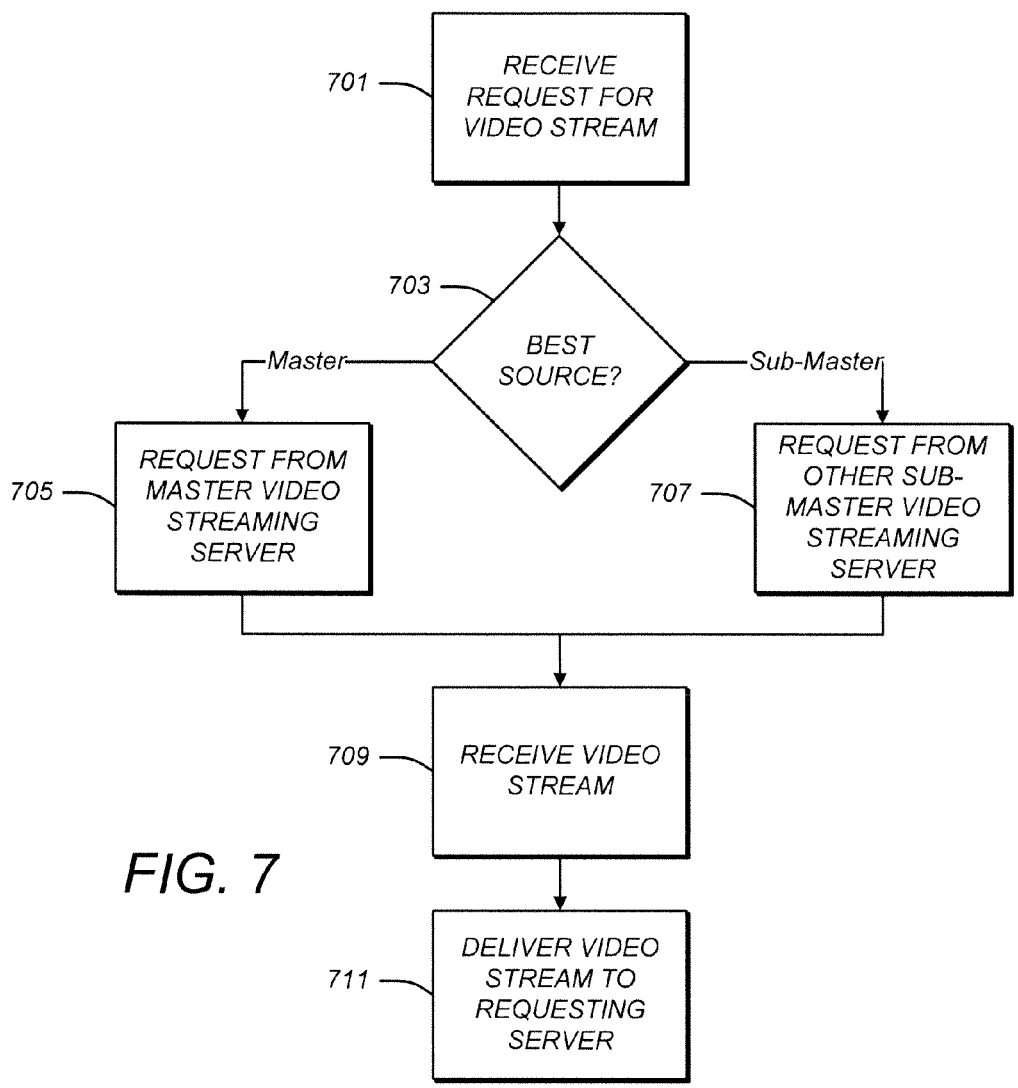
FIG. 7 illustrates an example of a process that may be implemented by a sub-master video streaming server.

FIG. 7 illustrates an example of a process that may be implemented by a sub-master video streaming server. The sub-master video streaming server may be of any type, such as any of the types discussed above.

The sub-master video streaming server may receive a request for a video stream, as reflected by a Received Request For Video Stream step 701. This request may come from, for example, a slave streaming video server or another sub-master streaming video server.

As reflected by a Best Source? decision step 703, the sub-master video streaming server may determine whether the best source for receiving the requested video stream is a master video streaming server, such as any the types of master video streaming servers discussed above, or another sub-master video streaming server, such as any of the sub-master video streaming servers discussed above. This determination may be based upon any of the considerations discussed above in connection with this decision step.

If the best source is a master video streaming server, the sub-master video streaming server may request the video stream from the master video streaming server, as reflected by a Request From Master Video Streaming Server step 705. On the other hand, if the best source is another sub-master video streaming server, the sub-master video streaming server may request the video stream from the other sub-master video streaming server, as reflected by a Request From Other Sub-Master Video Streaming Server step 707.

The requested video stream may be received, as reflected by a Receive Video Stream step 709. The received video stream may be delivered to the server requesting the stream, as reflected by a Deliver Video Stream To Requesting Server step 711.

Figure 8:
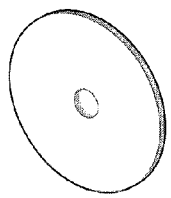
FIG. 8 illustrates an example of a non-transitory, tangible, computer-readable storage media that may contain programming instructions useful in a sub-master video streaming server.

FIG. 8 illustrates an example of non-transitory, tangible, computer-readable storage media that may contain programming instructions useful in a sub-master video streaming server. The media in the example is a CD. It may instead be any other type of non-transitory, tangible, computer-readable storage media, such as a DVD, hard disk drive, RAM, PROM, flash memory, or any combination of these. These instructions may be configured to cause a computer system within the sub-master video streaming server that is running the instructions to implement any or all of the process steps that the sub-master video streaming server performs, as discussed above.

The various servers that have been discussed are each implemented with a computer system configured to perform the functions that have been described herein for the server. Each computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Address User Stations

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, although the streaming video server system has been illustrated as containing only a single master streaming video server, the streaming video server system may have multiple master streaming video servers, each with their own hierarchical set of sub-masters, slaves, and user stations, as described herein. Several of such masters may request and received needed video streams from a super-master server. In other words, the three-tier streaming video server hierarchy that has been described herein can be expanded to any number of greater levels.

Although the servers have thus-far been described as delivering only video streams, they may instead deliver audio or other types of streams or even files, such audio or multimedia streams or files. For example, the streams may be gaming streams from multi-player video feeds or multi-user virtual world feeds as described above.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim means that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A system comprising:
    a master streaming video server comprising:
        a network interface configured to communicate information between the master streaming video server and a computer network;
        a memory;
        a processor coupled to the network interface and the memory; and
        a master streaming video server program stored in the memory, wherein execution of the master streaming video server program by the processor causes the master streaming video server to implement functions, including functions to:
            receive video streams;
            receive sub-master requests for video streams from multiple sub-master streaming video servers, each sub-master request for one of the video streams;
            transcode, based at least in part on received sub-master requests, some number of video streams;
            transrate, based at least in part on received sub-master requests, some number of video streams; and
            for each received sub-master request, deliver the video stream requested by the sub-master request to the sub-master streaming video server that made the sub-master request;
    multiple sub-master streaming video servers, each respective sub-master streaming video server comprising:
        a network interface configured to communicate information between the respective sub-master streaming video server and the computer network;
        a memory;
        a processor coupled to the network interface and the memory of the respective sub-master streaming video server; and
        a sub-master streaming video server program stored in the memory of the respective sub-master streaming video server, wherein execution of the sub-master streaming video server program by the processor of the respective sub-master streaming video server causes the sub-master streaming video server to implement functions, including functions to:
            receive slave requests for video streams from multiple slave streaming video servers;
            for each of a first plurality of the received slave requests:
                deliver, based at least in part on status information from one or more of the other sub-master streaming video servers, a sub-master request to one of the other sub-master streaming video servers for the video stream requested by the slave request;
                receive the video stream that is requested by the slave request from the one other sub-master streaming video server; and
                deliver the video stream that is requested by the slave request and received from the one other sub-master streaming video server to the slave streaming video server that made the request;
            receive sub-master requests for video streams from other sub-master streaming video servers; and
            for each received sub-master request, deliver the respective video stream that is requested by the respective received sub-master request from the respective sub-master streaming video server to the respective other sub-master streaming video server that made the respective received sub-master request; and
    for each of the sub-master streaming video servers, multiple slave streaming video servers, each slave streaming video server comprising:
        a network interface configured to communicate information between the slave streaming video server and the computer network;
        a memory;
        a processor coupled to the network interface and the memory; and
        a slave streaming video server program stored in the memory, wherein execution of the slave streaming video server program by the processor causes the slave streaming video server to implement functions, including functions to:
            receive user requests for video streams from multiple user stations;
            for each received user request:
                deliver a slave request to the respective sub-master streaming video server for the video stream requested by the user request;
                receive the video stream requested by the user request from the respective sub-master streaming video; and
                deliver the video stream requested by the user request to the user station that made the user request.

2. The system of claim 1 wherein execution of the sub-master streaming video server program further causes each of the sub-master streaming video servers to implement functions, including functions to:
    for each of a second plurality of the received slave requests:
        deliver, based at least in part on status information from the master streaming video server, a sub-master request to the master streaming video server for the video stream requested by the slave request;
        receive the video stream that is requested by the slave request from the master streaming video server; and
        deliver the video stream that is requested by the slave request to the slave streaming video server that made the request.

3. The system of claim 2 wherein:
    the status information from the master streaming video server includes an amount of bandwidth currently used by the master streaming video server as an indication of load being handled by the master streaming video server; and execution of the sub-master streaming video server program further causes each of the sub-master streaming video servers to implement functions, including a function to determine whether to deliver their sub-master requests to the master streaming video server or to another sub-master streaming video server based on the load being handled by the master streaming video server.

4. The system of claim 2 wherein:

the status information from one or more of the other sub-master streaming video servers includes an amount of bandwidth currently used by the respective one or more other sub-master streaming video servers as an indication of load being handled by the respective one or more other sub-master streaming video servers; and execution of the sub-master streaming video server program further causes each of the sub-master streaming video servers to implement functions, including a function to determine whether to deliver their sub-master requests to the master streaming video server or to another sub-master streaming video server based on the load being handled by the other sub-master streaming video server.

5. The system of claim 2 wherein execution of the sub-master streaming video server program further causes each of the sub-master streaming video servers to implement functions, including a function to determine whether to deliver their sub-master requests to the master streaming video server or to a sub-master streaming video server based on the locations of the master and the sub-master streaming video servers relative to the sub-master streaming video server that is delivering the sub-master request.

6. The system of claim 2 wherein:

the status information from one or more of the other sub-master streaming video servers includes an amount of bandwidth currently used by the respective one or more other sub-master streaming video servers as an indication of load being handled by the respective one or more other sub-master streaming video servers; and execution of the sub-master streaming video server program further causes each of the sub-master streaming video servers to implement functions, including a function to determine which other sub-master streaming video server to deliver their sub-master requests to based on the loads being handled by the other sub-master streaming video servers.

7. The system of claim 2 wherein execution of the sub-master streaming video server program further causes each of the sub-master streaming video servers to implement functions, including a function to deliver their sub-master requests to the other sub-master streaming video server that is closest to the sub-master streaming video server that is delivering the request.

8. The system of claim 1 wherein execution of the sub-master streaming video server program further causes each of the sub-master streaming video servers to implement functions, including a function to not deliver video streams directly to any of the user stations.

9. The system of claim 1 wherein execution of the slave streaming video server program further causes each of the slave streaming video to implement functions, including a function to not send a slave request to the master streaming video server.

10. The system of claim 1 wherein execution of the master streaming video server program further causes the master streaming video server to implement functions, including a function to not deliver a video stream directly to any of the slave streaming video servers.

11. The system of claim 1 wherein execution of the master streaming video server program further causes the master streaming video server to implement functions, including a function to not deliver a video stream directly to any of the user stations.

12. The system of claim 1 wherein execution of the sub-master streaming video server program further causes each of the sub-master streaming video servers to implement functions, including a function to not deliver a sub-master request in response to a received slave request when the sub-master streaming video server is already receiving the video stream that is requested by the slave request.

13. The system of claim 1 wherein the video streams are real time video streams.

14. A sub-master streaming video server comprising:

a network interface configured to communicate information between the sub-master streaming video server and a computer network;

a memory;

a processor coupled to the network interface and the memory; and a sub-master streaming video server program stored in the memory, wherein execution of the sub-master streaming video server program by the processor causes the sub-master streaming video server to implement functions, including functions to:

receive slave requests for video streams from multiple slave streaming video servers;

for each of a first plurality of the received slave requests:

deliver, based at least in part on status information from one or more of a plurality of other sub-master streaming video servers, a sub-master request to one of the other sub-master streaming video servers for the video stream requested by the slave request, wherein:

the status information from the one or more of the plurality of other sub-master streaming video servers includes an amount of bandwidth currently used by the respective one or more other sub-master streaming video servers as an indication of load being handled by the respective one or more other sub-master streaming video servers; and the one of the other sub-master streaming video servers is determined based on the load being handled by the one other sub-master streaming video server;

receive the video stream that is requested by the slave request from the one other sub-master streaming video server; and deliver the video stream that is requested by the slave request from the one other sub-master streaming video server to the slave streaming video server that made the request;

receive sub-master requests for video streams from other sub-master streaming video servers; and for each received sub-master request, deliver the respective video stream that is requested by the respective received sub-master request to the respective other sub-master streaming video server that made the respective received sub-master request.

15. The sub-master streaming video server of claim 14 wherein execution of the sub-master streaming video server program further causes the sub-master streaming video server to implement functions, including functions to:
  for each of a second plurality of the received slave requests:
    deliver, based at least in part on status information from a master streaming video server, a sub-master request to the master streaming video server for the video stream requested by the slave request;
    receive the video stream that is requested by the slave request from the master streaming video server; and
    deliver the video stream that is requested by the slave request to the slave streaming video server that made the request.

16. The sub-master streaming video server of claim 15 wherein:
  the status information from the master streaming video server includes an amount of bandwidth currently used by the master streaming video server as an indication of load being handled by the master streaming video server; and
  execution of the sub-master streaming video server program further causes the sub-master streaming video server to implement functions, including a function to determine whether to deliver each sub-master request to the master streaming video server or to another sub-master streaming video server based on the load being handled by the master streaming video server.

17. A process implemented by a sub-master streaming video server, the process comprising:
  receiving, by the sub-master streaming video server, slave requests for video streams from multiple slave streaming video servers;
  for each of a first plurality of the received slave requests:
    delivering, based at least in part on status information from one or more of a plurality of other sub-master streaming video servers, a sub-master request to one of the other sub-master streaming video servers for the video stream requested by the slave request, wherein:
      the status information from the one or more of the plurality of other sub-master streaming video servers includes an amount of bandwidth currently used by the respective one or more other sub-master streaming video servers as an indication of load being handled by the respective one or more other sub-master streaming video servers; and
      the one of the other sub-master streaming video servers is determined based on the load being handled by the one other sub-master streaming video server;
    receiving the video stream that is requested by the slave request from the one other sub-master streaming video server; and
    delivering the video stream that is requested by the slave request to the slave streaming video server that made the request;
  receiving sub-master requests for video streams from other sub-master streaming video servers, each sub-master request for one of the video streams; and
  for each received sub-master request, delivering the respective video stream that is requested by the respective received sub-master request to the respective other sub-master streaming video server that made the respective received sub-master request.

18. The process of claim 17 further comprising the sub-master streaming video server:
  for each of a second plurality of the received slave requests:
    delivering, based at least in part on status information from a master streaming video server, a sub-master request to the master streaming video server for the video stream requested by the slave request;
    receiving the video stream that is requested by the slave request from the master streaming video server; and
    delivering the video stream that is requested by the slave request to the slave streaming video server that made the request.

19. The process of claim 18 further comprising:
  receiving status information indicating a load being handled by the master streaming video server, the status information including an amount of bandwidth currently used by the master streaming video server; and
  the sub-master streaming video server determining whether to deliver each sub-master request to the master streaming video server or to another sub-master streaming video server based on the load being handled by the master streaming video server.

20. A non-transitory, tangible, computer-readable storage medium containing a program of instructions configured to cause a sub-master streaming video server running the program of instructions to:
  receive slave requests for video streams from multiple slave streaming video servers, each slave request for a video stream;
  for each of a first plurality of the received slave requests:
    deliver, based at least in part on status information from one or more of a plurality of other sub-master streaming video servers, a sub-master request to one of the other sub-master streaming video servers for the video stream requested by the slave request, wherein:
      the status information from the one or more of the plurality of other sub-master streaming video servers includes an amount of bandwidth currently used by the respective one or more other sub-master streaming video servers as an indication of load being handled by the respective one or more other sub-master streaming video servers; and
      the one of the other sub-master streaming video servers is determined based on the load being handled by the one other sub-master streaming video server;
    receive the video stream that is requested by the slave request from the one other sub-master streaming video server; and
    deliver the video stream that is requested by the slave request to the slave streaming video server that made the request;
  receive sub-master requests for video streams from other sub-master streaming video servers; and
  for each received sub-master request, deliver the respective video stream that is requested by the respective received sub-master request to the respective other sub-master streaming video server that made the respective received sub-master request.

21. The non-transitory, tangible, computer-readable storage medium of claim 20, wherein the program of instructions further causes the sub-master streaming video server running the program of instructions to, for each of a second plurality of the received slave requests:
  deliver, based at least in part on status information from a master streaming video server, a sub-master request to the master streaming video server for the video stream requested by the slave request;
  receive the video stream that is requested by the slave request from the master streaming video server; and deliver the video stream that is requested by the slave request to the slave streaming video server that made the request.

22. The non-transitory, tangible, computer-readable storage medium of claim 21, wherein:
the status information from the master streaming video server includes an amount of bandwidth currently used by the master streaming video server as an indication of load being handled by the master streaming video server; and
the program of instructions further causes the sub-master streaming video server running the program of instructions to determine whether to deliver each sub-master-request to the master streaming video server or to another sub-master streaming video server based on the load being handled by the master streaming video server.

* * * * *